Sept. 13, 1960 B. CORNELISON 2,952,528
AUTOMATIC TRANSISTOR BAR ETCHING
Filed Oct. 11, 1956

INVENTOR
Boyd Cornelison
BY Stevens, Davis, Miller and Mosher
ATTORNEYS

United States Patent Office 2,952,528
Patented Sept. 13, 1960

2,952,528

AUTOMATIC TRANSISTOR BAR ETCHING

Boyd Cornelison, Dallas, Tex., assignor to Texas Instruments Incorporated, Dallas, Tex., a corporation of Delaware Filed Oct. 11, 1956, Ser. No. 615,285

4 Claims. (Cl. 41—42)

Figure 1:
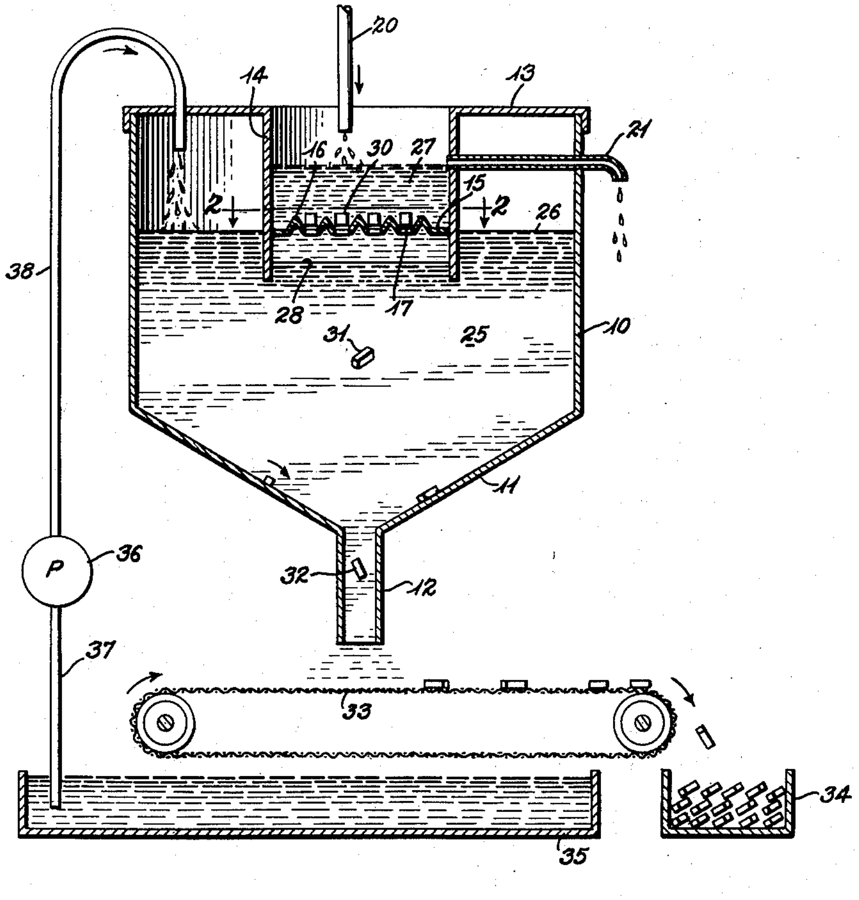

The present invention relates to a method for automatically etching bars and for terminating the etching action when the bars undergoing treatment have reached predetermined dimensions, thereby combining a sizing operation with the etching treatment and eliminating subsequent sizing of the bars. The invention is particularly adapted to transistor bars.

It has been recognized as necessary to etch transistor bars as a finishing treatment prior to mounting the bars in headers. To make transistor bars, a customary procedure involves preparing a crystal of semiconductor material properly doped by some suitable means, as for example, in a crystal puller, and thereafter cutting the crystal into a plurality of transistor bars. The cutting operations are normally conducted by sawing with diamond studded blades or by a cavitron. As a result of these operations the surface region of each bar is distributed due to shocks and other harmful disturbances and this surface region must be removed by some convenient means prior to the completion of transistors employing the bars. The most convenient means is to etch the bars. In etching, as it is done today, the transistor bars are simply dumped into an etching solution where they are allowed to remain until upon visual observation it appears that a sufficient portion of the surface of each bar has been removed. Thereafter, the bars are removed from the solution, washed and dried, and are sized. After sizing they are then ready for mounting.

Although the preceding paragraph refers specifically to transistor bars, it is to be understood that the invention broadly relates to all types and forms of bars of any material whatever.

It is an object of the present invention to provide a method whereby the etching of bars and transistor bars in particular can be conducted in a continuous fashion without the necessity of continually observing the etching process in order to insure that the bars are not etched too severely. In addition to the etching, the bars are sized, thereby relieving the necessity to pursue this operation as a separate step. Essentially, this is achieved by placing the bars to be treated in an etching solution and by supporting the bars in a unique fashion so that when the bars have been reduced in size by virtue of the etching action, they will be able to pass through the bar support and will gravitate out of the etching solution into an inert medium which will stop further etching action. As will be evident, this procedure results in the bars being both etched and sized at the same time. As a refinement to the method and apparatus of the invention, the bars are further removed from the inert medium and led to a collector receptacle ready to be taken to the next step in their handling.

By the present invention, there is provided for the first time a method for automatically conducting an etching process with reference to transistor bars that also sizes them, thereby avoiding a separate step for this purpose. The method is characterized by simplicity and reliability and the invention can be carried out quite economically and expediently.

Figure 2:
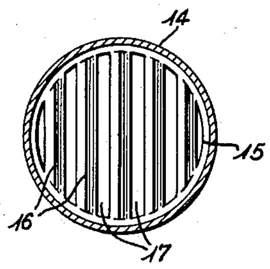

Other and further objects of the present invention will become apparent from the following detailed description of a preferred embodiment of the invention when taken in conjunction with the drawings in which:

Figure 1 shows the apparatus employed to carry out the method of the present invention; and Figure 2 is a view in section of Figure 1 taken along line 2—2.

Referring now to the drawing in detail, a preferred embodiment of the apparatus of the present invention will be described. There is provided a container 10 having a sloping bottom 11, which is substantially conical in design, having a discharge spout 12 located at the lowermost point of the sloping bottom 11. In addition, the container 10 is provided with a top annular cover 13 having a central depending skirt 14 which projects inwardly of the container 10. Positioned within the depending skirt 14 and supported thereby is a bar support 15 in the form of a grid. The support 15 defines a plurality of parallel troughs each defining an open bottom. The troughs are defined by adjacent angle sections 16 forming part of the grid or support 15. The open bottom of each trough is designated by the numeral 17. In effect the support or grid 15 defines a series of parallel slots each having a width equal to the desired width of a bar at the conclusion of a normal etching operation. A pipe 20 is provided emptying into the space defined within the depending skirt 14 for the purpose of introducing etching solution into this area. A drain pipe 21 communicates the space within the depending skirt 14 above the grid 15 with a point outside of the container 10 and functions as an overflow pipe.

In the practice of the invention, an inert medium is placed in the container 10 as indicated by the numeral 25. This inert medium may be any composition which will stop the etching action of an etching fluid on a bar. Examples of inert fluid which can be used are carbon tetrachloride ($CCl_4$), compositions made by the Minnesota Mining and Manufacturing Company, and designated by the trade names "Fluorochemical O-75," which is a completely fluorinated cyclic ether with the empirical formula $C_8F_{16}O$ and Fluorochemical N-43 which is heptacosafluorotributylamine expressed empirically as $(C_4F_9)_3N$, and "Aroclor-1248," a material produced by the Monsanto Chemical Company; "Aroclor" being a trade name of a series of polychlorinated polyphenyls, of which No. 1248 is particularly adapted for use in the instant invention. Although several specific examples for inert fluid 25 have been given, it will be understood that there are other substances and compounds which will be useful as inert fluid 25 including fluoro-chemicals other than those named above. Specific mention is meant to be by way of illustration and not limitation. The inert fluid 25 is placed in the container 10 up to the level indicated by the numeral 26 which, as will be apparent, is above the lower end of the depending skirt 14. At the same time etching fluid is introduced through the pipe 20 within the depending skirt 14 By the proper choice of specific gravity, the etching fluid will rest on top of the inert medium in the space within the depending skirt 14. The interface between the etching fluid designated by the numeral 27 and the inert medium 25 within the depending skirt 14 is referenced by the numeral 28. It will be apparent that the lower level of the etching fluid will be below the bar support 15, but above the lower end of the depending skirt 14. It will also be apparent that the etching fluid is immiscible with reference to the inert medium and is of lesser specific gravity.

Bars are introduced onto the bar support 15 through the opening defined by the annular cover 13 and by the very construction of the bar support 15, the bars will assume a position in alignment with the troughs defined by the bar support 15. Since the bars designated by the numeral 30 are in the etching medium at this time, they will be attacked and gradually reduced in width. When the bars have been eaten away to a width about equal to the width of the slots 17, they will then pass through the bar support 15, fall through the inert medium 25, as is indicated by the bar 31, fall through the spout 12, as indicated by the bar 32, and onto an endless belt conveyor 33 which will carry them to a collector receptacle 34. The endless belt conveyor 33 is designed as a mesh or screen and fluid passing through the spout 12 will pass through the endless belt 33 and be received in a receptacle 35. A pump 36 draws the inert fluid from the receptacle 35 via conduit 37 and recirculates it via conduit 38 back into the container 10. It will be appreciated that the pump 36 will operate at a volume rate sufficient to return inert fluid to the container 10 at substantially the same volume rate as the inert fluid is leaving the container 10 through the spout 12.

Transistor bars must be sized in one manner or another prior to mounting them in headers or otherwise. Since the etching is allowed to proceed until the bars can pass through the bar support, they are automatically sized. Thus, this technique does both the etching and sizing as one step avoiding extra steps and achieving better and more standardized results than if the etching and sizing were done separately.

Although the invention has been shown and described with reference to a preferred form of the invention, nevertheless, various changes and modifications obvious to one skilled in the art are deemed to be within the spirit, scope and contemplation of the invention.

What is claimed is:

1. Method of etching comprising introducing an article to be etched into an etching medium supported on an immiscible inert medium, at the adjacent interface of the two media, supporting said article in said etching medium, releasing said article responsive to a predetermined reduction in size and transferring said article through said interface to said inert medium to stop further etching action.

2. Method of etching comprising introducing an article to be etched into an etching medium supported on an immiscible inert medium, at the adjacent interface of the two media, supporting said article in said etching medium, releasing said article responsive to a predetermined reduction in size to fall through said interface by gravity into said inert medium to stop further etching action.

3. Method of etching comprising introducing an article to be etched into an etching solution supported on an immiscible inert heavier solution, supporting said article in said etching solution, releasing said article responsive to a predetermined reduction in size to fall into said inert solution to stop further etching action and transferring said article to a point of collection.

4. Method of etching comprising introducing an article to be etched into an etching medium floating in a captive condition on an immiscible inert medium, supporting said article in said etching medium, releasing said article responsive to a predetermined reduction in size to fall by gravity into said inert medium to stop further etching action, discharging said article from said inert medium and receiving said discharged article and conveying same to a collection point.

References Cited in the file of this patent

UNITED STATES PATENTS

| | | |
|---|---|---|
| 2,416,716 | Ross | Mar. 4, 1947 |
| 2,638,220 | Schneider | May 12, 1953 |
| 2,734,804 | Courthope | Feb. 14, 1956 |